US008885672B2

(12) United States Patent
Rodbro et al.

(10) Patent No.: US 8,885,672 B2
(45) Date of Patent: *Nov. 11, 2014

(54) METHOD OF TRANSMITTING DATA IN A COMMUNICATION SYSTEM

(75) Inventors: Christoffer Rodbro, Stockholm (SE); Soren Skak Jensen, Stockholm (SE); Jonas Lindblom, Solna (SE); Renat Vafin, Tallinn (EE); Soren Vang Andersen, Aalborg (DK)

(73) Assignee: Skype, Dublin (IE)

( * ) Notice: Subject to any disclaimer, the term of this patent is extended or adjusted under 35 U.S.C. 154(b) by 246 days.

This patent is subject to a terminal disclaimer.

(21) Appl. No.: 13/484,655

(22) Filed: May 31, 2012

(65) Prior Publication Data

US 2012/0275585 A1 Nov. 1, 2012

Related U.S. Application Data

(63) Continuation of application No. 12/005,058, filed on Dec. 21, 2007, now Pat. No. 8,194,706.

(30) Foreign Application Priority Data

Mar. 20, 2007 (GB) .................................. 0705325.9

(51) Int. Cl.
  *H04J 3/06* (2006.01)
  *H04L 12/66* (2006.01)
  *H04L 12/64* (2006.01)

(52) U.S. Cl.
  CPC ..... *H04L 12/6418* (2013.01); *H04L 2012/6489* (2013.01); *H04L 12/66* (2013.01)
  USPC .......................................... 370/519; 370/252

(58) Field of Classification Search
  CPC .................. H04L 12/2665; H04L 12/2657
  USPC .................. 370/464, 498, 503, 516, 517, 519
  See application file for complete search history.

(56) References Cited

U.S. PATENT DOCUMENTS 6,963,553 B1 11/2005 Cordier et al.
8,194,706 B2 6/2012 Rodbro (Continued)

FOREIGN PATENT DOCUMENTS

CN 101636990 1/2010
EP 2140637 3/2011

(Continued)

OTHER PUBLICATIONS

International Search Report, PCT Application No. PCT/IB2007/004443, (Nov. 5, 2008), 3 pages.

(Continued)

*Primary Examiner* — Gary Mui
(74) *Attorney, Agent, or Firm* — Sonia Cooper; Jim Ross; Micky Minhas

(57) ABSTRACT

Processing of a signal received at a node in a network is described in which effects on the signal caused by applying an action to a first part of the signal are quantified based on characteristics of the first part of the signal and effects on the signal caused by not applying the action to the first part of the signal are quantified based on characteristics of a second, subsequent part of the signal. The action may then be selectively applied either to the first part of the signal or to the second part of the signal based upon the quantifications. In some embodiments, the action is applied to a portion of the signal for which the effects on at least one measure of the signal quality are less detrimental.

20 Claims, 3 Drawing Sheets

(56) References Cited

U.S. PATENT DOCUMENTS

| | | |
|---|---|---|
| 8,385,325 B2 * | 2/2013 | Vafin et al. .................. 370/352 |
| 2005/0069026 A1 | 3/2005 | Vepsalainen et al. |
| 2007/0127389 A1 | 6/2007 | Klotz et al. |
| 2007/0211704 A1 * | 9/2007 | Lin et al. ..................... 370/356 |
| 2008/0232442 A1 | 9/2008 | Rodbro et al. |

FOREIGN PATENT DOCUMENTS

| | | |
|---|---|---|
| RU | 2009138517 | 4/2011 |
| WO | WO-2004023706 | 3/2004 |
| WO | WO-2005009019 | 1/2005 |
| WO | WO-2008114084 | 9/2008 |

OTHER PUBLICATIONS

Non Final Office Action, U.S. Appl. No. 12/005,058, (Sep. 29, 2011), 7 pages.

Notice of Allowance, U.S. Appl. No. 12/005,058, (Feb. 6, 2012), 6 pages.

Foreign Notice of Allowance, EP Application No. 07870467.3, (Oct. 26, 2010), 7 pages.

Foreign Office Action, Chinese Application No. 200780052264.X, (Nov. 23, 2011), 7 pages.

Foreign Office Action, EP Application No. 07870467.3, (Feb. 11, 2010), 2 pages.

* cited by examiner

METHOD OF TRANSMITTING DATA IN A COMMUNICATION SYSTEM

PRIORITY

This application is a continuation of and claims priority under 35 U.S.C. §120 to U.S. patent application Ser. No. 12/005,058 filed Dec. 21, 2007, which claims priority under 35 U.S.C. §119 or 365 to Great Britain Application No. 0705325.9, filed Mar. 20, 2007, the disclosures of which are incorporated herein by reference in their entirety.

TECHNICAL FIELD

The present invention relates to communication systems. More particularly the present invention relates to a method and apparatus for processing digital signals, particularly packet based transmission of speech information in a communication system.

BACKGROUND

In a communication system a communication network is provided, which can link together two communication terminals so that the terminals can send information to each other in a call or other communication event. Information may include speech, text, images or video.

Modern communication systems are based on the transmission of digital signals. Analogue information such as speech is input into an analogue to digital converter at the transmitter of one terminal and converted into a digital signal. The digital signal is then encoded and placed in data packets for transmission over a channel to the receiver of another terminal.

One type of communication network suitable for transmitting data packets is the internet. Protocols which are used to carry voice signals over an Internet Protocol network are commonly referred to as Voice over IP (VoIP). VoIP is the routing of voice conversations over the Internet or through any other IP-based network.

A data packet includes a header portion and a payload portion. The header portion of the data packet contains data for transmitting and processing the data packet. This information may include an identification number and source address that uniquely identifies the packet, a header checksum used to detect processing errors and the destination address. The payload portion of the data packet includes information from the digital signal intended for transmission. This information may be included in the payload as encoded frames such as voice frames, wherein each frame represents a portion of the analogue signal.

Degradations in the channel on which the information is sent will effect the information received at the receiving terminal. Degradations in the channel can cause changes in the packet sequence, delay the arrival of some packets at the receiver and cause the loss of other packets. The degradations may be caused by channel imperfections, noise and overload in the channel. This ultimately results in a reduction of the quality of the signal output by the receiving terminal.

In order to ensure that the data in the data packets may be output continuously at the destination terminal, it is necessary to introduce a delay between receiving a data packet and outputting the data in the packet, in order to over come random variations in the in the delay between packets arriving at the terminal.

A jitter buffer is used at the receiving terminal to introduce a delay between receiving data packets from the network and outputting the data from the terminal. The jitter buffer stores packets or frames temporarily to cope with the variations in the arrival times of packets, such that the jitter buffer may continuously provide frames to be output to a decoder.

A jitter buffer manager is arranged to control the amount of frames in the jitter buffer over time. The jitter buffer manager may control the number of frames in the jitter buffer, thereby adjusting the delay introduced by the jitter buffer, by requesting that the decoder performs an action that will affect the time at which the decoder requires the next frame from the jitter buffer.

In order to delay the time that the decoder requires the next frame, the jitter buffer manager may be arranged to request that the decoder inserts a copy of the last frame or extents the play out time of a frame, for example by stretching the length of the frame from 20 ms to 30 ms. Conversely in order to reduce the time that the decoder requires the next frame, the jitter buffer manager may be arranged to request that the decoder skips a frame or shortens the play out time of a frame, for example by compressing the length of the frame, from 20 ms to 10 ms. If however the delay introduced by the jitter buffer does not need to be altered the jitter buffer manager may request that the decoder decodes the frame without modifying the signal.

Simple jitter buffers introduce a delay by adapting the delay such that a predetermined number of packets or frames are held the jitter buffer. However it is advantageous to adapt the number of packets held in the buffer to effectively handle changing network conditions. Therefore, in some methods known in the art, a target number of frames to be stored in the jitter buffer may be calculated adaptively.

Altering the time at which the decoder takes the next frame from the jitter buffer by the above described methods will often result in a distortion of the output signal, e.g. resulting from stretching or compression of frames. Loss and jitter concealment (LJC) methods are designed to minimize the distortion caused by adapting the delay. The operation of a jitter buffer and an LJC unit will now be described with reference to FIG. 2.

FIG. 2 shows an example of receiving circuitry 10 in a terminal used to receive data packets transmitted from the network 104, according to the prior art. The receiving circuitry includes a jitter buffer block 12, a decoder block 14, an LJC unit 15 and a digital to analogue converter.

The jitter buffer block 12 receives data packets from the network 104. The jitter buffer block 12 comprises a jitter buffer storage arranged to temporarily store data packets received from the network, and a jitter buffer manager that is arranged to determine the action required by the decoder block 14. The required action is reported to the decoder block 14 as shown by connection 22.

The decoder block 14 receives data provided in the payload of the data packets in the form of a bit stream output from the jitter buffer block 12, as shown by connection 20. The decoder block 14 decodes the bit stream according to the applied encoding scheme.

The parameters of the signal are analysed to determine the presence of voice activity on the signal. From this the LJC unit 15 is arranged to determine if the action output from the jitter buffer block on connection 22 can be applied to the signal in the decoder. Typically actions that adjust the delay introduced at the jitter buffer are preferred during periods of silence so that modifications to the delay are less audible in the signal. However the delay may also be adjusted during active voice periods by analysing the parameters in the signal that indicate the type of voice data in the signal. As an example, it is known that adjusting the delay during stable speech sounds such as 's' sound in 'sing' or the 'a' sound in 'car' causes less distortion to the signal than during unstable plosive speech sounds such as the 'k' sound in 'kid'. In some known methods the response of the decoder or LJC unit to the required action is reported by the decoder block 14 to the jitter buffer block 12 as shown by the connection 24.

It should be noted that the action may be carried out in the decoder 14 or in the LJC unit 15. This is an implementation issue.

The delayed signal is output via the decoder 14 as a decoded digital signal to the digital to analogue converter 16. The digital to analogue converter 16 converts the decoded digital signal to an analogue signal. The analogue signal may then be output by an output device such as a loudspeaker.

Controlling the delay in accordance with type of voice data in the signal to minimise the distortion in the signal reduces the degree to which the delay introduced to the received signal can be adjusted in accordance with the changing network conditions. This can cause problems, such as missing data and perceptual artefacts in the concealment or unnecessarily high buffering delay, especially when the conditions of the network change rapidly.

It is therefore an aim of the present invention to improve the perceived quality of the received signal. It is a further aim of the present invention to provide a method of improving the quality of the received signal without the use of complex computational methods.

SUMMARY

According to a first aspect of the present invention there is provided a method of processing a signal received at a node in a network, comprising the steps of;

receiving the signal at the node; determining characteristics of a first part of the signal; determining characteristics of a second part of the signal that is subsequent to the first part of the signal; quantifying an effect on the signal caused by applying an action to the first part of the signal, based on characteristics of the first part of the signal; quantifying an effect on the signal caused by not applying the action on the first part of the signal, based on characteristics of the second part of the signal; applying the action to the first part of the signal if it is determined that the effect on the signal caused by applying the action to the first part of the signal is less detrimental to at least one measure of the signal quality than the effect on the signal caused by not applying the action to the first part of the signal.

According to a second aspect of the present invention there is provided a node for processing a signal received from a network, comprising: means for receiving the signal; means for determining characteristics of a first part of the signal; means for determining characteristics of a second part of the signal that is subsequent to the first part of the signal; means for quantifying an effect on the signal caused by applying an action to the first part of the signal, based on characteristics of the first part of the signal; means for quantifying an effect on the signal caused by not applying the action on the first part of the signal, based on characteristics of the second part of the signal; means for applying the action to the first part of the signal if it is determined that the effect on the signal caused by applying the action to the first part of the signal is less detrimental to at least one measure of the signal quality than the effect on the signal caused by not applying the action to the first part of the signal.

BRIEF DESCRIPTION OF THE DRAWINGS

For a better understanding of the present invention and to show how the same may be carried into effect, embodiments of the present invention will now be described with reference to the following drawings.

DETAILED DESCRIPTION

Figure 1:
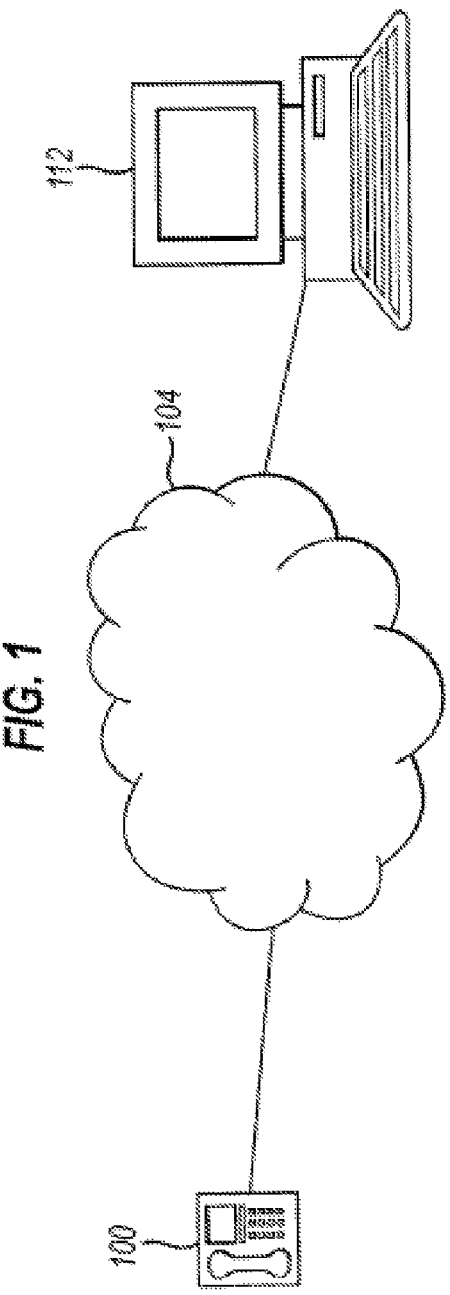
FIG. 1 is a diagram of a communication system.

Reference will first be made to FIG. 1, which shows a terminal 100 and a terminal 112 connected to a communication network 104. The terminal 100 is arranged to transmit data to the terminal 112 via the communication network 104. In one embodiment of the invention the communications network is a VoIP network provided by the internet. It should be appreciated that even though the exemplifying communications system shown and described in more detail herein uses the terminology of a VoIP network, embodiments of the present invention can be used in any other suitable communication system that facilitates the transfer of data.

The terminals 100 and 112 may be, for example, a personal computer, a gaming device, a personal digital assistant, a suitably enabled mobile phone or other mobile device, a television or other device able to connect to the network 104.

The inventors of the present invention have identified that the urgency of adjusting the delay during one part of the signal depends on future characteristics of the received signal.

The inventors have identified that by monitoring or predicting the future characteristics of the received signal, it can be determined if the delay can be adjusted more advantageously in the future. It may therefore be determined that the optimum action may be to adjust the delay during a subsequent part of the signal.

The inventors have also identified that decisions to adjust the delay during one part of the signal have an effect on subsequent parts of the signal. Accordingly by monitoring or predicting the future characteristics of the received signal the effect that adjusting the delay during one part of the signal has on subsequent parts of the signal may be considered when deciding whether to adjust the delay.

The future characteristics of the signal may relate to the present and, or, future transmission states of the network.

By assessing the effect that adjusting the delay will have on subsequent parts of the signal, an optimum action may be determined by comparing the immediate consequences of taking the action to the longer term consequences of taking the action. For example the immediate consequences of increasing the delay during the current speech sound may be that audible distortions will occur in the output signal. However if the network delay is rapidly increasing, the longer term consequence of not increasing the delay may be that the jitter buffer runs empty and potentially a far worse artefact in the output signal than that caused by adding delay to the current speech sound may occur. It may therefore be determined that the optimum action may be to increase the delay during the current speech sound, even if adjusting the delay sound during the current speech sound would cause a signal distortion which if considered in isolation would be avoided.

According to an embodiment of the invention the decision to adjust the delay during one part of the received signal is dependent on future characteristics of the received signal.

In one embodiment of the invention the future characteristics of the signal relate to the estimated arrival time of packets in the signal that have not yet been received at the terminal.

Figure 2:
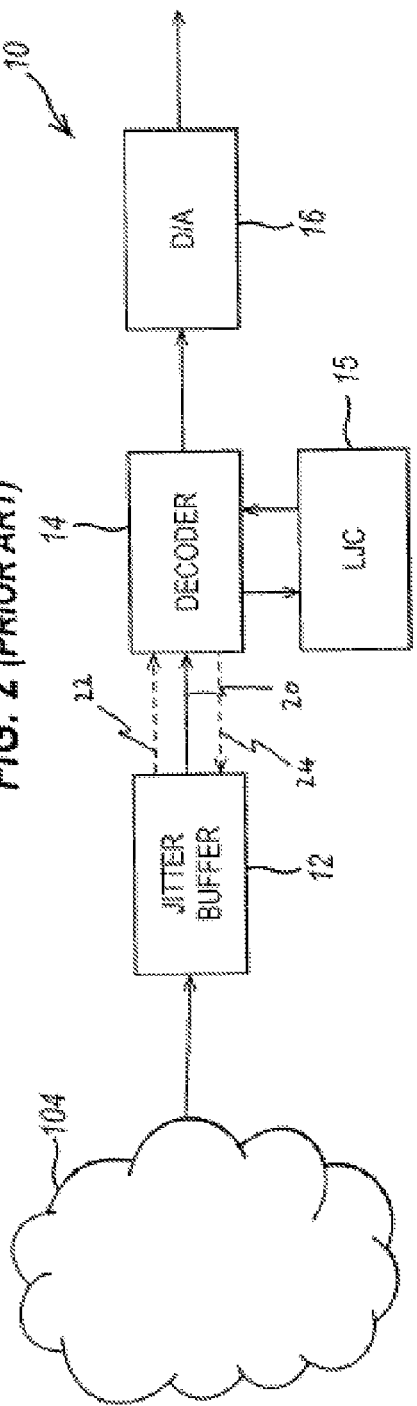
FIG. 2 is a diagram of receiving circuitry used in a terminal according to the prior art.
Figure 3:
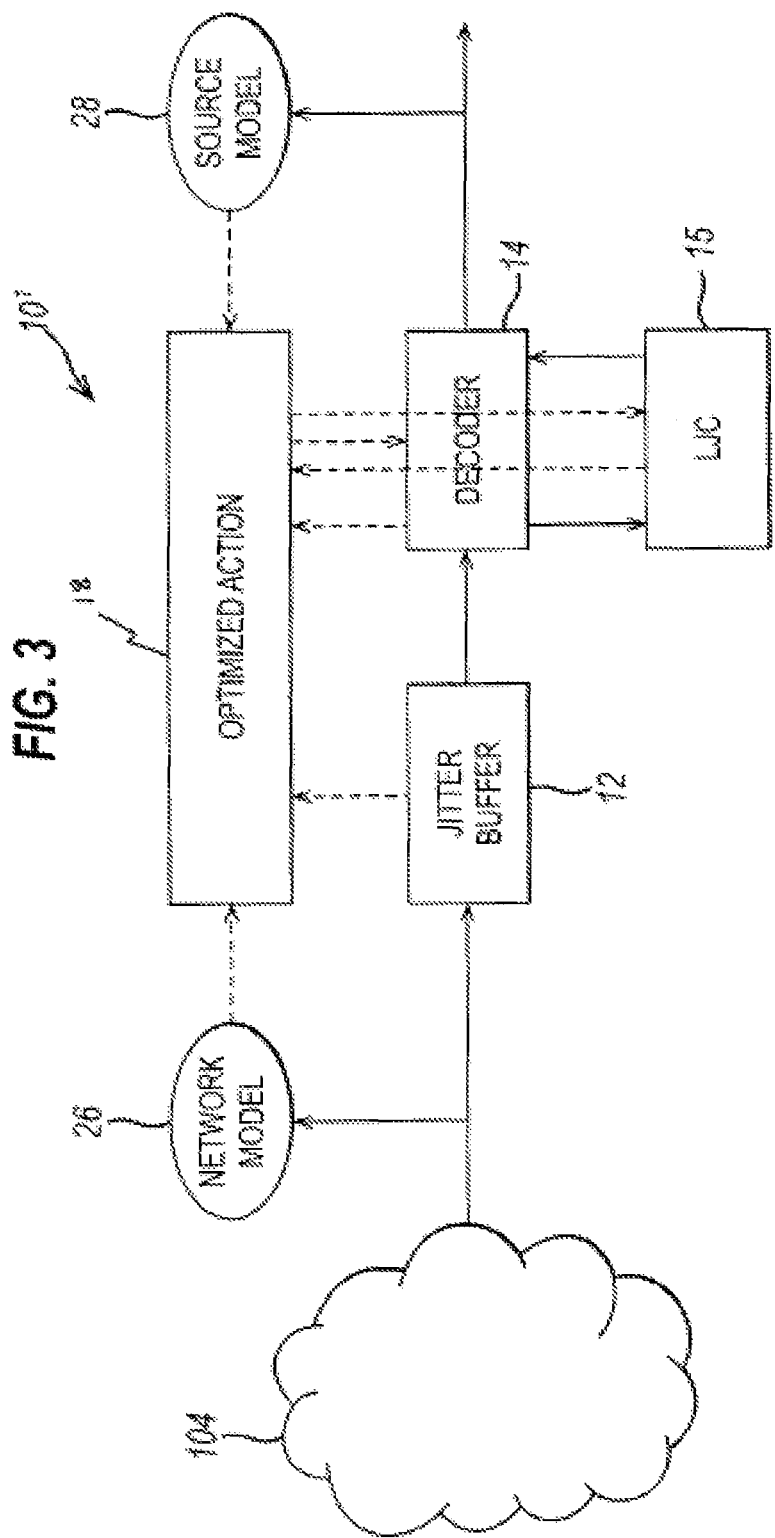
FIG. 3 is a diagram of receiving circuitry used in a terminal according to an embodiment of the present invention.

The manner in which an embodiment of the invention may be implemented will now be described with reference to FIG. 3. FIG. 3 shows the receiving circuitry 10' of the terminal 112 according to an embodiment of the present invention. The components in the receiving circuitry 10' that are described in relation to FIG. 2, are referred to in FIG. 3 using like reference numerals. It will be readily appreciated that the receiving circuitry described in relation to FIG. 3 may also be present in the terminal 100.

The receiving circuitry 10' shown in FIG. 3 comprises a jitter buffer block 12, a decoder 14, an LJC unit 15 and a digital to analogue converter 16.

According to an embodiment of the invention the receiving circuitry 10' further comprises an optimised action block 18. The optimised action block 18 is arranged to determine an optimised action to be taken by the decoder 14 or the LJC unit 15 on the part of the signal being decoded.

The future characteristics of the signal relate to the characteristics of the subsequent parts of the signal that follow the part of the signal where the delay may be adjusted. In the embodiment shown in FIG. 3, the part of the signal where the delay may be adjusted is the part of the signal at the decoder 14. As such the future characteristics of the signal may relate to the characteristics of the part of the signal that is stored in the jitter buffer and, or, the characteristics of the part of the signal that has not yet arrived at the terminal 112.

The signal characteristics may relate to the characteristics of the signal that effect the signal distortion when an action to adjust the delay is applied, for example characteristics associated with voice information. The signal characteristics may also relate to characteristics of the signal that relate to the propagation delay of the signal in the network. Characteristics of a part of the signal that has not yet arrived at the terminal may be predicted from characteristics of the received signal.

In FIG. 3 the received signal is shown as a solid line. Information derived from the received signal, otherwise referred to as metadata, is shown as a dashed line, while actions are shown as a dotted and dashed line.

Signal metadata may be provided to the optimised action block from the jitter buffer 12, the decoder 14 and the LJC unit 15. As shown in FIG. 3 metadata may also be provided from a network model block 26 and a source model block 28. The network model block 26 and the source model block 28 will be described in more detail herein after. Metadata, rather than the signal, is provided to the optimised action block in order to reduce the complexity of the information that the optimisation block 18 is required to process.

The metadata provided to the optimised action block 18 may comprise information derived from the signal that may be used to determine signal distortion resulting from an action. Alternatively, or additionally, the metadata provided to the optimised action block may comprise information derived from the signal that may be used to determine the signal propagation delay or propagation delay variation. The metadata may therefore include information relating to voice activity and voice type and signal parameters including pitch stability, signal power and the periodicity of the signal.

In particular, the optimised action block 18 may be arranged to monitor metadata relating to: present information in signal, the present state of the jitter buffer, the present transmission state of the network, the present state of the decoder, the present state of the LJC unit, an estimation of the future information in signal, an estimation of the state of the jitter buffer, an estimation of the future transmission state of the network, an estimation of the future state of the decoder and, or, an estimate of the future state of the LJC unit. This list is an example of the types of metadata that may be provided to the optimisation block and is not exhaustive.

Metadata provided from the jitter buffer block 12 may be used to determine signal propagation delay or variations in the signal propagation delay for subsequent parts of the signal. For example the metadata provided from the jitter buffer block 12 may define the time of arrival of packets at the jitter buffer. The optimised action block 18 may monitor the delay between the times of arrival of each packet over a period of time to determine the variations in the signal propagation delay for the packets received by the jitter buffer. The optimised action block 18 may also use the delay between the times of arrival of packets received to predict the propagation delay of subsequent parts of the signal not yet received at the terminal 112.

Alternatively the metadata provided from the jitter buffer block 12 may define the number of packets in the jitter buffer storage. If there are a small number of packets stored in the jitter buffer storage, for example less than a predetermined threshold, the optimised action block 18 may predict that network propagation delay for subsequent parts of the signal is high. Also by monitoring the number of packets that are present in the jitter buffer storage over a period of time the optimisation unit may also determine the rate at which the signal propagation delay is changing and use this information to predict the propagation delay of the parts of the signal not yet received at the terminal 112.

Metadata provided from the jitter buffer block 12 may also be used to determine voice activity on subsequent parts of the signal which may cause distortions if an action is applied. The metadata may define parameters that can be extracted from the encoded speech frames in the jitter buffer to indicate characteristics such as the presence of voice activity or the stability of the voiced sound.

Metadata provided from the decoder 14 and the LJC unit 15 may be used to determine characteristics on the part of the signal at the decoder. Parameters may be extracted from the encoded bit stream before the signal is decoded or from the decoded signal after the signal has been decoded. The parameters may be related to voice information in the signal. In one embodiment of the invention the metadata indicating the length of the encoded bit stream representing a frame or a collection of frames may be provided.

The metadata provided from the LJC unit 15 may relate to the internal state of the LJC unit. The internal state of the LJC unit may for example relate to the signal from which it generates concealment samples or from residual values that are dependent on a part of the signal that was previously used to generate concealment samples. Alternatively the metadata provided from the LJC unit 15 may indicate the action applied most recently by the LJC unit. For example the LJC unit may report that the last action it performed was to insert a frame into the signal. By monitoring these actions the optimised action block 18 may determine the changes in the signal propagation delay and from this predict the signal propagation delay for subsequent parts of the signal.

The network model block 26 is arranged to monitor characteristics of the signal that relate to the propagation of the signal over the network. For example the network model block 26 may monitor the arrival time of frames of the signal, or the transmission degradation of the signal. The network model block applies this information to a statistical model that allows the propagation delay of the signal in the network to be predicted. The predicted propagation delay is reported to the optimised action block 18 as shown by the metadata connection in FIG. 3.

The source model block 28 is arranged to monitor the decoded signal output from the decoder 14 to determine characteristics in the signal that relate to information transmitted in the signal. The source model block may be arranged to model the speech patterns in the decoded signal in order to predict voice information in the future. In one embodiment of the invention the source model also receives an input from a voice activity detector (not shown) arranged to detect voice information on the signal transmitted from the terminal 112. This information is used to assess the interactivity of the conversation in order to predict future periods of silence in the received signal. The predicted voice information is provided to the optimised action block 18 as shown by the metadata connection output from the source model block as shown in FIG. 3.

It should be appreciated that the above example on voice activity, is given merely to exemplify metadata derived from the source model that can be measured or estimated to assess the effect on the signal caused by applying an action. A person skilled in the art will appreciate that other meta data may be derived from the signal output from the decoder, such as voicing, energy envelope in time or frequency, phoneme, and the evolution of these characteristics over time, to assess the effect on the signal of applying the action without diverging from the general scope of this invention.

The optimum action may be derived by the optimised action block 18 from the metadata received from at least one of the components of the receiving circuitry. According to one embodiment of the invention the optimum action is determined deterministically by applying the metadata to a rule which determines the optimised action. According to another embodiment of the invention the optimum action is determined stochastically by monitoring the statistics of the metadata and determining an action based on the probabilities or expectations of the effects of performing an action. In a preferred embodiment of the invention the optimum action is determined by combining stochastic and deterministic methods.

The following describes an example of a rule that may be applied in the optimised action block to determine an optimum action to be performed on the received signal.

Figure 4:
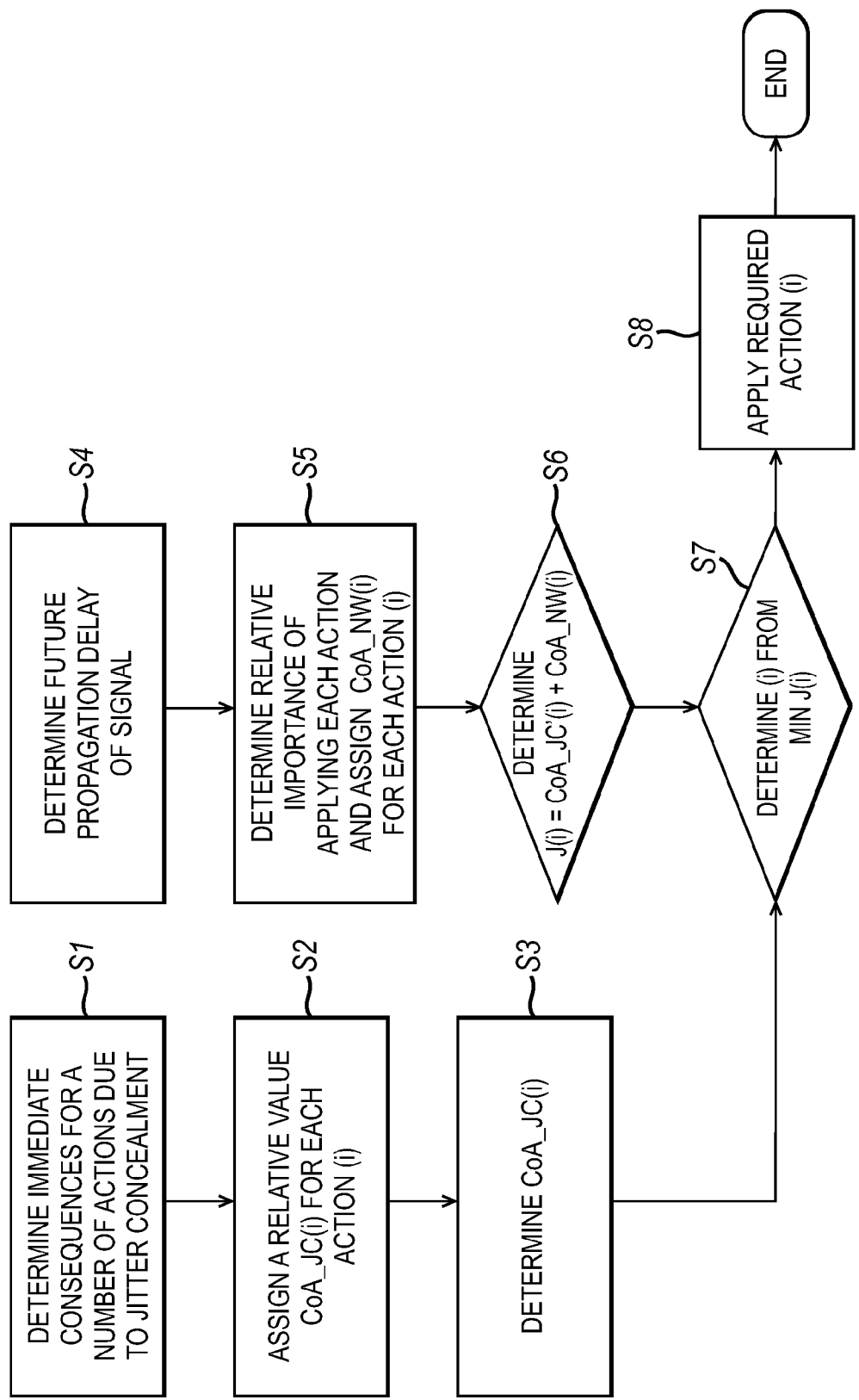
FIG. 4 is a flowchart illustrating an algorithm according to an embodiment of the present invention.

Reference will now be made to FIG. 4 which describes the steps of an algorithm carried out by the optimised action block 18 to determine an optimised action according to an embodiment of the present invention.

In order to assess the immediate effect that adjusting the delay will have on the signal, metadata on the part of the signal to which an action, such as an insert or skip, stretch or compress may be applied is provided to the optimized action block 18.

As shown in step 1 of FIG. 4, the immediate consequences for applying a number of possible actions are determined by the optimised action block 18. For example the consequences of applying an insert, a skip, or decoding the signal without taking any further action, are each determined. These consequences may be quantified relatively, such that the consequences of each action may be compared. For example a scaled value may be applied to quantify the consequence of each action.

In one embodiment of the invention the immediate consequence of applying an insert may be determined from the frame most recently output from the decoder, since this is the frame that the LJC unit will copy to insert a frame.

The consequence of skipping a frame may be determined from the next frame immediately following the frame that will be skipped. In particular the adaptive codebook gains of the following frame may be used to calculate the consequence of skipping the frame. If the gain is high, the following frame is highly dependent on the frame to be skipped, and thus skipping the frame is likely to have higher impact on the perceived signal quality.

As shown in step 2, the consequences determined for each action (i) are assigned a relative value. The relative value of a consequence for each action may be referred to as the cost of the action (CoA). Since the consequences relate to the effect that jitter concealment has on the signal, the consequences for each of these actions may be more specifically defined as the cost of action for jitter concealment (CoA_JC). In an embodiment of the invention the greater the signal distortion caused by applying the action, the higher the value of CoA_JC.

In order to determine the CoA_JC for a particular action, a CoA_JC function is applied in the optimisation action block to the metadata on the part of the signal to which the action is to be applied. If the metadata provided to the optimisation block defines the voice type in the signal the CoA function may determine that the CoA_JC for an adjustment in delay during a plosive sound is high and should be avoided, whereas the CoA_JC for an adjustment in delay during a period of voice inactivity is low and easily tolerated.

In an embodiment of the invention the CoA_JC, which describes the immediate effect of applying an action, may be adjusted based on future signal characteristics such as the presence of voice information in subsequent parts of the signal.

In one embodiment of the invention the CoA_JC for each action may be adjusted based on the effect of applying the action during the subsequent parts of the signal instead of the part of the signal currently in the decoder.

In step 3 an adjusted value CoA_JC' for each action (i) is determined based on the information in the subsequent parts of the signal. For example if the voice information in the subsequent part of the signal indicates that an action will cause less signal distortion if the action is applied during the subsequent part of the signal, the value of CoA_JC is raised for that action in order to decrease the possibility of the action being applied immediately. Conversely, if the voice information in the subsequent part of the signal indicates that an action will cause more signal distortion if the action is applied during the subsequent part of the signal, the value of CoA_JC is lowered for that action in order to increase the possibility of the action being applied immediately.

For example, in one embodiment of the invention the metadata is extracted from the frames in the jitter buffer to calculate the adjusted value CoA_JC' for the current frame. A value for CoA_JC for each action is calculated for each frame in the jitter buffer. This allows an adjusted value CoA_JC' for applying the action to the present frame to be determined by considering the difference in the value of CoA_JC for the present frame and CoA_JC for frames in the jitter buffer.

In a further embodiment, the metadata are predicted to provide adjustment of CoA_JC into CoA_JC' based on expected characteristics of the signal in the future.

In step 4 the optimised action block is arranged to consider the propagation delay of subsequent parts of the signal in the network.

In accordance with an embodiment of the invention the optimised action block 18 is arranged to determine the propagation delay of subsequent parts of the signal in order to determine the longer term effect of applying an action with respect to the network conditions.

The propagation delay or propagation delay variation of the subsequent parts of the signal may be determined from metadata provided from the decoder 14, the LJC unit 15, the jitter buffer 12 or the network model block 26. It is not necessary to determine a value for the absolute propagation delay. An indication of the propagation delay is sufficient to assess the network conditions. Furthermore the propagation delay may be an estimate of the time of arrival of the next packet to be received by the terminal.

Since the propagation delay of subsequent parts of the signal is a future condition of the signal, the relative importance of applying the action can be determined. For example if it is determined that the network propagation delay will remain high for subsequent parts of the signal the importance for applying an insert action is high. If however it is determined that the network propagation delay is increasing the importance for applying an insert action is very high.

The relative importance of performing the action to compensate for the signal propagation delay in the network will be referred to as the cost of action to compensate for the network conditions (CoA_NW). In step 5 the optimised action block is arranged to determine the CoA_NW for each possible action. In an embodiment of the invention the greater the importance of applying an action to compensate for network delay the lower the value of CoA_NW. The lower the value of CoA_NW the more likely the optimum action block will apply the action.

In step 6 the optimised action block 18 is arranged to determine the optimum action to be applied to the part of the signal currently at the decoder by combining CoA_JC' and CoA_NW for the each action according to:

$$J(i)=CoA\_JC'(i)+CoA\_NW(i) \quad \text{Equation (1)}$$

wherein J is the combined cost of applying an action and i denotes an action.

In step 7 the optimised action block determines the minimum value of J(i). The corresponding action (i) that has the minimum value of J is determined to be the optimum action.

In step 8 the optimised action block instructs either the LJC unit 15 or the decoder 14 to apply the required action.

In an alternative embodiment of the invention the possible actions are not limited to those which increase the delay, decrease the delay or do not adjust the delay. Other possible actions may include actions that prepare the signal for actions which adjust the delay. For example the action may apply a perturbation to the signal to compensate for the distortion caused by applying the action. Alternatively the power envelope of the signal may be modified in preparation for an insert action.

Alternative embodiments of the invention may apply actions that alter the sequence of insert or stretch actions to avoid tonality or musical artifact.

In addition to these, other actions can be implemented, such as actions relating to the specific handling of lost packets, without diverging from the spirit of the invention.

In an alternative embodiment of the invention the knowledge about the decoder and the LJC unit may be used to determine a CoA_JC function. The CoA_JC function may be tuned to determine a CoA_JC for particular values of certain parameters defined in the metadata. Alternatively in order to set the CoA_JC function in the optimisation block 18, the LJC unit may perform inserts or skips at random positions in a large number of speech packet streams and then measure the speech degradation locally around the point of the operation using e.g. PESQ (Perceptual Evaluation of Speech Quality).

In this manner, pairs of metadata and degradations are obtained. A mapping method such as multivariate linear regression or Gaussian Mixture Modelling may be employed to determine the probable degradation from the metadata from which the CoA_JC may be determined.

In an alternative embodiment of the present invention the CoA_JC is not adjusted to take into account the effect of applying actions during the subsequent parts of the signal. In this embodiment of the invention the optimised action block 18 is arranged to determine the optimum action to be applied to the part of the signal currently at the decoder by combining CoA_JC and CoA_NW for the each action according to:

$$J(i)=CoA\_JC(i)+CoA\_NW(i) \quad \text{Equation (2)}$$

In an alternative embodiment of the invention it is not necessary to explicitly determine the effects of applying each possible action. For example in an alternative embodiment of the invention the effects of applying an action may be implicitly taken into consideration using a function that calculates the optimum action from the metadata provided.

In embodiments of the present invention the required processing may be implemented as hardware or by using appropriately adapted software executed on a processor. Software for implementing the invention may be stored on and provided by means of a carrier medium such as a carrier disc, card or tape. A possibility is to download the software via a data network. This is an implementation issue.

While this invention has been particularly shown and described with reference to preferred embodiments, it will be understood to those skilled in the art that various changes in form and detail may be made without departing from the scope of the invention as defined by the claims.

What is claimed is:

1. A method implemented by a computing device to process a signal received by the computing device over a network comprising:
    computing a first cost that is associated with applying an action to a first part of the signal currently being processed at a decoder of the computing device based upon characteristics determined for the first part of the signal;
    computing a second cost that is associated with applying the action to a subsequent part of the signal that occurs in the signal subsequent to the first part based upon characteristics that are predicted for the subsequent part of the signal;
    ascertaining which of the first cost and the second cost is lower, said costs being indicative of relative effects of the action upon the signal;
    when the first cost is lower, applying the action to the first part of the signal; and
    when the second cost is lower, applying the action to the subsequent part of the signal.

2. A method as recited in claim 1 further comprising predicting the characteristics of the subsequent part of the signal based at least in part upon the characteristics determined for the first part of the signal.

3. A method as recited in claim 1, wherein the action relates to adjusting a delay between receiving data frames of the signal at the computing device and processing of the data frames by the decoder.

4. A method as claimed in claim 3, wherein the action comprises increasing the delay by one or more of stretching a length of at least one data frame in the signal or inserting one or more data frames in the signal.

5. A method as claimed in claim 3, wherein the action comprises decreasing the delay by skipping at least one data frame in the signal.

6. A method as claimed in claim 1, wherein said costs that are computed reflect respective changes in quality of the signal due to the action such that a lower computed cost indicates less change to the quality of the signal relative to a higher computed cost.

7. A method as recited in claim 1, wherein the characteristics that are predicted for the subsequent part of the signal comprise estimated arrival times for data frames in the subsequent part of the signal.

8. A method as recited in claim 1, further comprising deriving signal metadata from the signal used to compute said costs.

9. A method as recited in claim 8, wherein the metadata is indicative of an amount of signal distortion that is expected in the signal due to application of the action to different respective parts of the signal.

10. A method as recited in claim 8, wherein the metadata is indicative of an amount of propagation delay due to network conditions expected for parts of the signal not yet received at the computing device.

11. A method as recited in claim 1, wherein the signal comprises packetized voice data received as a plurality of digital data packets.

12. A computing device for processing a signal received over a network comprising:
   a jitter buffer configured to introduce a delay between receiving of data packets for the signal over the network and outputting of the packets for the signal;
   a decoder configured to decode the signal for output according to an encoding scheme;
   an action optimizer component configured to determine whether to apply an action to adapt the delay introduced by the jitter buffer to a first part of the signal currently being processed at the decoder or to a subsequent part of the signal by:
      obtaining signal metadata derived from the signal that is indicative of an amount of signal distortion that is expected due to the action and an amount of propagation delay for the signal due to network conditions;
      determining characteristics for the first part of the signal and the subsequent part of the signal based on the obtained metadata;
      quantifying effects associated with applying the action to the first part of the signal and applying the action based on the characteristics that are determined; and
      selecting whether to apply the action to the first part of the signal currently being processed at the decoder or wait and apply the action to the subsequent part of the signal based on a comparison of the effects.

13. A computing device as recited in claim 12, wherein the metadata is obtained by the action optimizer component from multiple components of the computing device including at least one of the jitter buffer or the decoder.

14. A computing device as recited in claim 12, wherein determining the characteristics comprises predicting the characteristics of the subsequent part of the signal based at least in part upon metadata that is derived from the first part of the signal currently being processed at the decoder.

15. A computing device as recited in claim 12, wherein the signal metadata includes information regarding one or more of voice activity in the signal, a voice type, pitch, stability, signal power, or periodicity of the signal.

16. A computing device as recited in claim 12, wherein the network comprises a voice over Internet Protocol (VOIP) network.

17. A computing device as recited in claim 12, wherein the action optimizer component is further configured to instruct the decoder to perform the action to adapt the delay introduced by the jitter buffer to the first part of the signal or the subsequent part of the signal in accordance with the selection made based on the comparison of the effects.

18. A receiving apparatus for processing a voice signal received over a voice over Internet Protocol (VOIP) network comprising:
   receiving circuitry configured to receive the voice signal and process the voice signal for output via an output device; and
   an action optimizer component configured to:
      quantify, based on analysis of metadata derived from the voice signal, relative amounts of signal degradation that are expected for applying an action to control a delay introduced into the voice signal to a first part of the signal currently being decoded by the receiving apparatus and applying the action to control the delay to a subsequent part of the voice signal; and
      instruct the receiving circuitry to apply the action to either the first part of the voice signal or the subsequent part of the voice signal based at least in part upon which one of the first part or the subsequent part has a lower relative amount of signal degradation with respect to application of the action.

19. A receiving apparatus as recited in claim 18, wherein the analysis of metadata comprises:
   determining characteristics of the first part of the voice signal from the metadata;
   predicting characteristics of the subsequent part of the voice signal based on the determined characteristics of the first part of the voice signal.

20. A receiving apparatus as recited in claim 18, wherein the action optimizer component is further configured to:
   assess, based on the analysis of the metadata derived from the voice signal, propagation delay variations for the voice signal indicative of network conditions; and
   use the propagation delay variations in combination with the relative amounts of signal degradation that are quantified to determine whether to instruct the receiving circuitry to apply the action to the first part of the voice signal or the subsequent part of the voice signal.

* * * * *